UNITED STATES PATENT OFFICE.

ALWIN MITTASCH, OF LUDWIGSHAFEN-ON-THE-RHINE, GERMANY, ASSIGNOR TO ALIEN PROPERTY CUSTODIAN.

PRODUCING HYDROGEN.

1,301,151.          Specification of Letters Patent.          Patented Apr. 22, 1919.

No Drawing.      Application filed June 25, 1914. Serial No. 847,324.

*To all whom it may concern:*

Be it known that I, ALWIN MITTASCH, a citizen of the German Empire, residing at Ludwigshafen-on-the-Rhine, Germany, have invented new and useful Improvements in Producing Hydrogen, of which the following is a specification.

It has been found that the catalytic conversion of carbon monoxid and steam into hydrogen and carbon dioxid can be carried out advantageously by passing gases containing carbon monoxid and steam at a raised temperature over an oxygen compound of one or more of the rare earth metals (see *Meyer, Ziebschrift für Elektrochemie* 17, 633) and in particular of cerium. It is preferred to employ the said oxygen compound in a finely divided or finely porous form; for instance, the precipitated hydroxid can be brought into suitably shaped lumps by itself or while employing a binding, or diluting agent, whereupon the lumps are heated and a gas mixture is passed over the catalytic agent.

The following example will serve to illustrate further the nature of this invention, which, however, is not confined to this example.

*Example.*

Precipitate a hot solution of cerium nitrate by means of ammonia, filter off the cerium hydroxid and dry it somewhat, form it into suitably shaped lumps and then heat it again. Then pass a mixture containing carbon monoxid and steam over the lumps at a temperature of from 500° to 600° C., whereupon a rapid conversion to hydrogen and carbon dioxid takes place.

In this application I do not claim the specific production of hydrogen by passing carbon monoxid and steam over a catalytic agent containing an oxid of a rare earth metal and a body promoting the activity of the said oxid, since this is claimed in the application Serial No. 842,954, but what I claim is:—

1. The process of producing hydrogen by passing carbon monoxid and steam over a heated catalytic agent containing an oxygen compound of a rare earth metal.

2. The process of producing hydrogen by passing carbon monoxid and steam over a heated catalytic agent containing cerium oxid.

In testimony whereof I have hereunto set my hand in the presence of two subscribing witnesses.

ALWIN MITTASCH.

Witnesses:
     J. ALEC LLOYD,
     H. MERLE COCHRAN.